United States Patent [19]

Siemionko

[11] 4,347,349

[45] Aug. 31, 1982

[54] AROMATIC POLYESTER AND FILAMENTS

[75] Inventor: Roger K. Siemionko, Newark, Del.

[73] Assignee: E. I. Du Pont de Nemours and Company, Wilmington, Del.

[21] Appl. No.: 173,099

[22] Filed: Jul. 28, 1980

[51] Int. Cl.$^3$ ............................................. C08G 63/06
[52] U.S. Cl. ................................... 528/190; 528/191; 528/193
[58] Field of Search ........................ 528/190, 193, 197

[56] References Cited

U.S. PATENT DOCUMENTS 4,219,461  8/1980  Calundann .......................... 528/173
4,256,624  3/1981  Calundann .......................... 528/173

*Primary Examiner*—Morton Foelak

[57] ABSTRACT

Polyesters of fiber-forming molecular weight consisting esssentially of methyl or chloro-1,4-dioxyphenylene units, terephthaloyl units and small amounts of 6-oxy-2-naphthoyl and units from other difunctional aromatic polyester-forming reactants.

12 Claims, No Drawings

AROMATIC POLYESTER AND FILAMENTS

BACKGROUND OF THE INVENTION

1. Field of the Invention

This invention relates to fiber-forming melt-spinnable aromatic polyesters and to filaments thereof having high tenacity and high modulus.

2. Description of the Prior Art

Aromatic polyesters capable of forming anisotropic melts and containing units derived from both chlorohydroquinone or methylhydroquinone and terephthalic acid have been disclosed in prior art patents U.S. Pat. Nos. 4,118,372; 4,075,262; 3,991,014; 4,066,620; 3,991,013; 4,146,702 and 4,156,070. In these polyesters, other monomers are present in addition to those mentioned above. For example, in U.S. Pat. No. 4,118,372 a portion of the terephthalic acid is replaced by 2,6-naphthalenedicarboxylic acid, however, polyesters with potential for making filaments having high tenacity and modulus require relatively high modification with the expensive 2,6-naphthalenedicarboxylic acid monomer. In U.S. Pat. No. 4,146,702, 3-hydroxybenzoic acid is added. U.S. Pat. No. 3,778,410 suggests hydroxyaromatic carboxylic acids as useful components in polyesters from ethylene glycol and terephthalic acid. 6-Hydroxy-2-naphthoic acid is shown in U.S. Pat. No. 4,161,470 as a comonomer with 4-hydroxybenzoic acid.

Chlorohydroquinone and terephthalic acid are relatively inexpensive ingredients, however, polyesters formed entirely from repeat units of these two materials are not melt processable into filaments. Even the addition of 4-hydroxybenzoic acid in small amounts as a comonomer does not result in a polyester that can be melt spun into filaments without degradation.

It has now been found that small amounts of 6-hydroxy-2-naphthoic acid bring the melting point of chlorohydroquinone- or methylhydroquinoneterephthalic acid polyesters into a range suitable for melt spinning and promote homogeneity, thereby making the melts of these polyesters more amenable to processing. Moreover, the filaments from these new polyesters exhibit high modulus as-spun and high tenacity upon heat treatment.

SUMMARY OF THE INVENTION

The present invention is directed to polyesters of fiber-forming molecular weight that exhibit optical anisotropy in the melt and consist essentially of units having the following structural formulas:

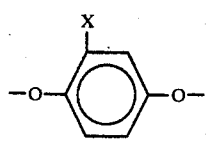

I

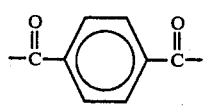

II

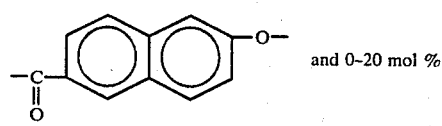

III and 0-20 mol % a $-O-R_1-O-$ and/or b $-CO-R_2-CO-$

IV wherein X is chloro- or methyl and unit 4a is a dioxy unit derived from hydroquinone, resorcinol, 2,5- or 2,6-dichlorohydroquinone, and unit IV b is isophthaloyl, in the proportions of about 75 to 95 mol % of Units I and II and about 5-25 mol % of Units III and IV of which at least 5 mol % is Unit III. Preferably Units IV are 1,3 or 1,4-dioxyphenylene or isophthaloyl units. Dioxy units and dicarbonyl units in the polymer are substantially equimolar in quantity. Melt-spun and heat strengthened filaments of such polyesters are included in the invention.

DETAILED DESCRIPTION OF THE INVENTION

The polyesters of the invention consist essentially of units as described above. Unit I, chloro-1,4-dioxyphenylene is normally provided by the diacetate of chlorohydroquinone and Unit II, terephthaloyl, by terephthalic acid. Unit III, 6-oxy-2-naphthoyl is generally derived from the monoacetate of 6-hydroxy-2-naphthoic acid. It will be apparent that other precursors can be usefully employed.

Hydroquinone, resorcinol, 2,5-, 2,6-dichlorohydroquinone or other dihydric phenols may be used to provide 0-20 mol % of the dioxy units (Unit IV a) in the polyester. Similarly, isopthalic or other aromatic dicarboxylic acids may be used to provide 0-20 mol % of dicarbonyl units (Unit IV b) in the polyester. The particular type and amount of difunctional reactant to be used (other than for Units I, II and III) will be governed by its effect on melting point, melt anisotropy, melt processibility or ultimate tensile strength of filaments from the polyesters. The number of dioxy units present in the polyester are substantially equivalent to the number of dicarbonyl units. The mol % of any unit is calculated based on the total mols of all repeat units present. Preferably, the polyester consists essentially of Units I, II and III.

Conventional polymerization techniques may be employed such as described in the aforementioned U.S. Pat. No. 4,118,372 and more particularly in the examples described below. The precursor reactants are combined in proportions corresponding to the molar proportions of the units desired in the polyester products. Functional equivalents of the precursors may be employed.

In general, a mixture of monomers (preferably with dihydric phenols in the form of their diacetates in up to 7% excess) are heated with stirring, under nitrogen, in a 250 ml 3-necked flask in a Wood's metal bath from approximately 250° C. to 330°-380° C. Polymerization is continued for up to a total of 0.5 to one hour or longer if necessary until a fiber-forming molecular weight is reached but is terminated before reaching excessive melt viscosity. Usually a vacuum is applied to obtain the final viscosity. The polyesters of the invention exhibit optical anisotropy in the molten state.

Filament Preparation

The polyesters may be spun into filaments by conventional melt-spinning techniques. In the examples below, filaments were prepared by melt-spinning into a quenching atmosphere of air or nitrogen and collected at a windup speed specified in the examples. The spinneret employed except in Ex. 6 had either 1 or 10 capillaries (holes), each shaped as a right circular cylinder 0.23 mm in diameter and 0.46 mm long. "Melt temperature" is the temperature at which the melt was maintained (values in parentheses are temperatures of the spinnerets). Melt pumping speed is adjusted to give a filament tex of about 0.5.

As used herein, the term "as-spun fiber" refers to a fiber which has not been drawn or heat treated after extrusion and normal windup.

Heat Treatment and Utility

Following collection, samples of undrawn (as-spun) monofilament or multifilament yarn were heat-treated substantially free of tension in an oven as described in U.S. Pat. No. 4,183,895. Heating was in stages in a nitrogen atmosphere. Typically, temperature was raised to 200° C. in 2 hrs, then to 304° C. in another 7 hrs, and finally maintained at 304° C. for an additional 7 hrs. Such a heating sequence is abbreviated as RT-200° C./2 hr+200°-304° C./7 hr+304° C./7 hr.

The heat-treated fibers of this invention are useful for a variety of industrial applications such as plastics and rubber reinforcement.

Inherent viscosity ($\eta_{inh}$) was computed from $$\eta_{inh} = \ln(\eta_{rel})/C$$

where $\eta_{rel}$ is the relative viscosity and C is a solution concentration of 0.5, i.e., 0.5 g of polymer per deciliter of solvent. Relative viscosity is the ratio of polymer solution flow time to solvent flow time in a capillary viscometer at 30° C. The solvent employed was either (A) a mixture of 7.5% trifluoroacetic acid/17.5% methylene chloride/12.5% dichlorotetrafluoroacetone hydrate/12.5% perchloroethylene/50% p-chlorophenol (all percentages by volume); or (B) 100% p-chlorophenol.

The polyesters of this invention are anisotropic in the melt as determined using the thermooptical test (TOT) described in U.S. Pat. No. 4,118,372. The polymers were characterized by "stick temperature" meaning the temperature of a thermal-gradient hot bar at the point at which the polymer first began to stick.

Monofilament tensile properties were measured using a recording stress-strain analyzer at 70° F. (21.1° C.) and 65% relative humidity. Sample lengths were 1.0 in (2.54 cm) for monofilaments and 10 in (25.4 cm) for multifilament yarns, and rate of elongation was 10%/min. Results are reported as D/T/E/M or T/E/M where D is linear density in tex units of the single filament or multifilament bundle, T is break tenacity in dN/tex, E is elongation-at-break expressed as the percentage by which initial length increased, and M is initial tensile modulus in dN/tex. Since linear density is normally substantially unchanged by heat-treatment, it is reported only for the as-spun filament or yarn.

Fibers of this invention have high heat-treated tenacities and high initial moduli (e.g., moduli of about 200 dN/tex or greater). Average tensile properties for at least five heat-treated filaments or yarns are reported in the examples.

EXAMPLES

The same general procedure was used in all the examples. It should be understood that the results reported below are believed to be representative and do not constitute all the runs involving the indicated reactants.

In the examples, the diacetate of the dihydric phenol and the monoacetate of the hydroxy-aromatic acid were used. The aromatic dicarboxylic acids were used as such rather than as esters or other derivatives.

The monomer ingredients were added to a 3-necked flask or resin kettle in substantially the same molar ratios as desired in the final polymer except that an excess (usually 5 to 7%) of acetylated dihydric phenols was generally used. The resultant polymer is identified, for example, as

CHQ/TPA/2,6HNA          (42/42/16)

meaning it was prepared from 42 mol % of the diacetate of chlorohydroquinone, 42 mol % of terephthalic acid and 16% of the acetate of 6-hydroxy-2-naphthoic acid (excesses of diacetates are not included in these percentages).

The 3-necked flask or resin kettle was fitted with: (1) a glass stirrer extending through a pressure-tight resin bushing, (2) a nitrogen inlet, and (3) a short Vigreux column leading to a water-cooled condenser with a flask for collecting acetic acid by-product. An attachment for application of vacuum was provided at the end of the condenser. An electrically heated Wood's metal bath mounted for vertical adjustment was used for heating. The reaction mixture was heated to increasing temperatures with stirring at atmospheric pressure under nitrogen purge until essentially all the acetic acid had evolved. Then vacuum was applied and pressure was reduced gradually from atmospheric to less than 1 mm of mercury. Heating under vacuum of less than 1 mm mercury pressure was then continued until viscosity had increased to a level believed satisfactory for melt-spinning. The cooled and solidified polymer was comminuted, and a portion was molded into a cylindrical plug for melt-spinning.

EXAMPLE 1

Filaments From Copolyesters of Chlorohydroquinone (CHQ), Terephthalic Acid (TPA) and 6-Hydroxy-2-Naphthoic Acid (2,6HNA)

| Polymerization Ingredients | | | | |
|---|---|---|---|---|
| | Grams Used | | | Mol Percent |
| Ex. | CHQ | TPA | 2,6HNA | CHQ/TPA/2,6HNA |
| 1A | 9.6(5%)* | 6.64 | 4.6 | 40/40/20 |
| 1B | 119.8(7%) | 81.3 | 48.30 | 41.2/41.2/17.6 |
| 1C | 109.2(7%) | 74.1 | 36.22 | 42.5/42.5/15 |
| 1D | 11.3(7%) | 7.68 | 1.73 | 46.25/46.25/7.5 |

*Percent excess

| Polymerization Conditions | | | |
|---|---|---|---|
| Ex. | Temp. °C. | Time, Min. | Pressure* |
| 1A | 270–350 | 28 | Atmospheric |
| | 350 | 10 | Reducing to below 1 mm Hg (i.e. about 30 inches Hg vacuum) |
| 1B | 274–311 | 37 | Atmospheric |
| | 311–334 | 30 | Reducing to below 1 mm Hg (133Pa) |
| | 334–336 | 28 | 0.4 mm Hg (53 Pa) |
| 1C | 283–310 | 31 | Atmospheric |
| | 310–332 | 26 | Reducing to below 1 mm Hg (133Pa) |

-continued

| | | | |
|---|---|---|---|
| | 332–338 | 28 | 0.4 mm Hg (53 Pa) |
| 1D | 260–360 | 45 | Atmospheric |
| | 360–365 | 10 | Reducing to below 1 mm Hg (133 Pa) |

*When pressure is indicated as "Reducing to below 1 mm Hg" a vacuum gauge was used which indicated 30 inches of mercury.

Polymer Characterizations

| Run | Inherent Viscosity | Solvent | Stick Temp. (°C.) |
|---|---|---|---|
| 1A | Insoluble | A | 220 |
| 1B | 3.10 | B | 218 |
| 1C | 3.13 | B | 244 |
| 1D | Insoluble | A | 300 |

Filament Extrusion

| Ex. | Temp (°C.) Melt (Spinneret) | Windup Speed (m/min) | No. of Holes |
|---|---|---|---|
| 1A | 305 (315) | 549 | 1 |
| 1B | 324 (324) | 500 | 10 |
| 1C | 320 (326) | 500 | 10 |
| 1D | 375 (375) | 549 | 1 |

Heat Treatment

| Run | Cycle |
|---|---|
| 1A | RT-200° C./2 hr + 200–304° C./7 hr + 304° C./7 hr |
| 1B | RT-200° C./2 hr + 200–304° C./7 hr + 304° C./7 hr |
| 1C | RT-200° C./2 hr + 200–304° C./7 hr + 304° C./7 hr |
| 1D | RT-200° C./2 hr + 200–304° C./7 hr + 304° C./7 hr |

Tensile Properties

| Ex. | As-Spun D/T/E/M | Heat Treated T/E/M | |
|---|---|---|---|
| 1A | 0.61/1.1/0.4/207 | 18.2/5.49/345 | |
| 1B | 64.4/7.3/2.0/463 | 22.7/4.4/426 | (Plied yarn) |
| 1C | 67.0/7.3/1.9/485 | 24.3/4.3/447 | (Plied yarn) |
| 1D | 1.1/5.3/1.4/460 | 16.6/3.6/517 | |

When the proportion of 6-hydroxy-2-naphthoic acid is increased such that 25 mol % of Unit III is present in the polyester, the filament T/E/M is 9.24/3.14/302 after heat treatment at RT-200° C./2 hr + 220° C./2 hr + 240° C./2 hr + 260° C./10 hr. It is anticipated that higher percentages of 6-hydroxy-2-naphthoic acid will lead to lower tenacity fibers.

Surprisingly, a control polyester prepared by replacing all of the 6-hydroxy-2-naphthoic acid of Example 1C with an equivalent amount of 3-chloro-4-hydroxybenzoic acid or 4-hydroxybenzoic acid could not be melt spun.

EXAMPLE 2

Filaments From Copolyesters of Methylhydroquinone (MHQ), Terephthalic Acid (TPA) and 6-Hydroxy-2-Naphthoic Acid (2,6HNA)

Polymerization Ingredients

| Ex. | Grams | | | Mol Percent |
|---|---|---|---|---|
| | MHQ | TPA | 2,6HNA | MHQ/TPA/2,6HNA |
| 2A | 8.74 (5%) | 6.64 | 4.6 | 40/40/20 |
| 2B | 9.28 (5%) | 7.06 | 3.45 | 42.5/42.5/15 |

Polymerization Conditions

| Ex. | Temp. °C. | Time, Min. | Pressure* |
|---|---|---|---|
| 2A | 280–350 | 30 | Atmospheric |
| | 350–358 | 15 | Reducing to below 1 mm Hg (133 Pa) |
| 2B | 270–330 | 30 | Atmospheric |
| | 330–350 | 20 | Reducing to below 1 mm Hg (133 Pa) |

*When pressure is indicated as "Reducing to below 1 mm Hg" a vacuum gauge was used which indicated 30 inches of mercury.

Polymer Characterizations

| Ex. | Inherent Viscosity | Solvent | Stick Temp. (°C.) |
|---|---|---|---|
| 2A | 2.04 | A | 210 |
| 2B | 1.77 | A | 280 |

Filament Extrusion

| Ex. | Temp (°C.) Melt (Spinneret) | Windup Speed (m/min) | No. of Holes |
|---|---|---|---|
| 2A | 290 (294) | 549 | 1 |
| 2B | 310 (312) | 549 | 1 |

Heat Treatment

| Ex. | Cycle |
|---|---|
| 2A | RT-230° C./2 hr + 250° C./2 hr + 270° C./2 hr + 290° C./10 hr |
| 2B | RT-200° C./2 hr + 200–304° C./7 hr + 304° C./7 hr |

Tensile Properties

| Ex. | As-Spun D/T/E/M | Heat Treated T/E/M |
|---|---|---|
| 2A | 0.81/2.5/0.66/278 | 9.3/3.2/347 |
| 2B | 0.54/3.7/1.0/381 | 11.4/3.8/321 |

EXAMPLE 3

Filaments From Copolyesters of Chlorohydroquinone (CHQ), Terephthalic Acid (TPA), Isophthalic Acid (IA), and 6-Hydroxy-2-naphthoic acid (2,6HNA)

Polymerization Ingredients

| Ex. | Grams | | | | Mol Percent |
|---|---|---|---|---|---|
| | CHQ | TPA | IA | 2,6HNA | CHQ/TPA/IA/2,6HNA |
| 3A | 33.0 (7%) | 21.1 | 1.24 | 6.9 | 45/42.5/2.5/10 |
| 3B | 110.0 (7%) | 66.44 | 8.3 | 23 | 45/40/5/10 |
| 3C | 11.0 (7%) | 5.81 | 1.66 | 2.3 | 45/35/10/10 |

Polymerization Conditions

| Ex. | Temp °C. | Time, Min. | Pressure* |
|---|---|---|---|
| 3A | 260–350 | 35 | Atmospheric |
| | 350–360 | 18 | Reducing to below 1 mm Hg (133 Pa) |
| 3B | 294–310 | 30 | Atmospheric |
| | 310–331 | 25 | Reducing to below 1 mm Hg (133Pa) |
| | 331–335 | 14 | 0.4 mm Hg (53 Pa) |
| 3C | 280–340 | 25 | Atmospheric |
| | 340–350 | 10 | Reducing to below 1 mm Hg (133 Pa) |

*When pressure is indicated as "Reducing to below 1 mm Hg" a vacuum gauge was used which indicated 30 inches of mercury.

Polymer Characterizations

| Ex. | Inherent Viscosity | Solvent | Stick Temp. (°C.) |
|---|---|---|---|
| 3A | 1.93 | B | 290 |
| 3B | 1.99 | B | 280 |
| 3C | — | — | 245 |

Filament Extrusion

| Ex. | Temp. (°C.) Melt (Spinneret) | Windup Speed (m/min) | No. of Holes |
|---|---|---|---|
| 3A | 330 (340) | 500 | 10 |
| 3B | 350 (353) | 500 | 10 |
| 3C | 295 (297) | 549 | 1 |

Heat Treatment

| Ex. | Cycle |
|---|---|
| 3A | RT-200° C./2 hr + 200–304° C./7 hr + 304° C./7 hr |
| 3B | RT-200° C./2 hr + 200–304° C./7 hr + 304° C./7 hr |
| 3C | RT-200° C./2 hr + 200–304° C./7 hr + 304° C./7 hr |

Tensile Properties

As-Spun       Heat Treated

-continued

| Ex. | D/T/E/M | T/E/M | |
|---|---|---|---|
| 3A | 12.2/4.3/0.88/484 | 19.4/3.5/512 | (Plied yarn) |
| 3B | 69.3/7.0/1.97/455 | 24.5/4.4/434 | (Plied yarn) |
| 3C | 0.77/3.3/1.28/305 | 14.7/5.2/289 | |

EXAMPLE 4

Filaments From a Copolyester of Chlorohydroquinone (CHQ), Resorcinol (RQ), Terephthalic Acid (TPA) and 6-Hydroxy-2-naphthoic Acid (2,6HNA)

Polymerization Ingredients

| | Grams | | | | Mol Percent |
|---|---|---|---|---|---|
| Ex. | CHQ | RQ | TPA | 2,6HNA | CHQ/RQ/TPA/2,6HNA |
| 4A | 29.3 (7%) | 2.91 | 22.4 | 6.9 | 40/5/45/10 |
| 4B | 8.56 (7%) | 2.07 (7%) | 7.47 | 2.3 | 35/10/45/10 |

Polymerization Conditions

| Ex. | Temp °C. | Time, Min. | Pressure* |
|---|---|---|---|
| 4A | 270–340 | 32 | Atmospheric |
| | 340–350 | 13 | Reducing to below 1 mm Hg (133 Pa) |
| 4B | 280–334 | 26 | Atmospheric |
| | 334–340 | 6 | Reducing to 0.5 mm Hg (67 Pa) |
| | 340–344 | 4 | 0.5 mm Hg (67 Pa) |

*When pressure is indicated as "Reducing to below 1 mm Hg" a vacuum gauge was used which indicated 30 inches of mercury.

Polymer Characterizations

| Ex. | Inherent Viscosity | Solvent | Stick Temp. (°C.) |
|---|---|---|---|
| 4A | 1.6 | B | 280 |
| 4B | — | — | 200 |

Filament Extrusion

| Ex. | Temp. (°C.) Melt (Spinneret) | Windup Speed (m/min) | No. of Holes |
|---|---|---|---|
| 4A | 315(322) | 500 | 10 |
| 4B | 305 (305) | 549 | 1 |

Heat Treatment

| Ex. | Cycle |
|---|---|
| 4A | RT-200° C./2 hr + 200–304° C./7 hr + 304° C./7 hr |
| 4B | RT-200° C./2 hr + 200–304° C./7 hr + 304° C./7 hr |

Tensile Properties

| Ex. | As-Spun D/T/E/M | Heat Treated T/E/M |
|---|---|---|
| 4A | 39.8/4.6/1.24/408 | 24.3/4.7/406 (Plied yarn) |
| 4B | 1.9/4.1/1.92/304 | 21.2/7.2/316 |

EXAMPLE 5

Filaments From a Copolyester of Chlorohydroquinone (CHQ), Hydroquinone (HQ), Terephthalic Acid (TPA) and 6-Hydroxy-2-naphthoic Acid (2,6HNA)

Polymerization Ingredients

| | Grams | | | | Mol Percent |
|---|---|---|---|---|---|
| Ex. | CHQ | HQ | TPA | 2,6HNA | CHQ/HQ/TPA/2,6HNA |
| 5A | 9.78 (7%) | 1.04 (7%) | 7.47 | 2.3 | 40/5/45/10 |

Polymerization Conditions

| Ex. | Temp °C. | Time, Min. | Pressure* |
|---|---|---|---|
| 5A | 280–340 | 30 | Atmospheric |
| | 340–360 | 10 | Reducing to below 1 mm Hg (133 Pa) |

*When pressure is indicated as "Reducing to below 1 mm Hg" a vacuum gauge was used which indicated 30 inches of mercury.

Polymer Characterizations

| Ex. | Stick Temp. (°C.) |
|---|---|
| 5A | 280 |

Filament Extrusion

| Ex. | Temp. (°C.) Melt (Spinneret) | Windup Speed (m/min) | No. of Holes |
|---|---|---|---|
| 5A | 344 (346) | 549 | 1 |

Heat Treatment

| Ex. | Cycle |
|---|---|
| 5A | RT-200° C./2 hr + 200–304° C./7 hr + 304° C./7 hr |

Tensile Properties

| Ex. | As-Spun D/T/E/M | Heat Treated T/E/M |
|---|---|---|
| 5A | 1.0/4.1/1.1/428 | 14.8/3.7/433 |

EXAMPLE 6

Filaments From a Copolyester of Chlorohydroquinone* (CHQ), Terephthalic Acid (TPA), and 6-Hydroxy-2-naphthoic Acid (2,6HNA)

Polymerization Ingredients

| | Grams Used | | |
|---|---|---|---|
| Ex. | CHQ | TPA | 2,6HNA |
| 6A | 546 (2%) | 370 | 181 |
| | Mole Percent | | |
| | 42.5 | 42.5 | 15 |

*Used as a mixture analyzing for 95.5 wt % (40.9 mol %) CHQ, 0.4 wt % (0.2 mol %) HQ and 3.8 wt % (1.4 mol %) of 2,5- and 2,6-dichlorohydroquinone diacetate.

Polymerization Conditions

| Ex. | Temp. °C. | Time, Min. | Pressure |
|---|---|---|---|
| 6A | 291–311 | 40 | Atmospheric |
| | 311–340 | 40 | (130–740 mm) |
| | 344–345 | 25 | (0.35–5 mm) |

Filament Extrusion

| Ex. | Temp (°C.) Melt | Windup Speed (m/min) | No. of Holes |
|---|---|---|---|
| 6A | 330–339 | 930 | 34 (0.30 mm long, 0.23 mm diameter) |

Heat Treatment

| Ex. | Cycle |
|---|---|
| 6A | RT-200° C./2 hr + 200–304° C./7 hr + 304° C./7 hr |

Tensile Properties

| Ex. | As-Spun D/T/E/M | Heat Treated T/E/M |
|---|---|---|
| 6A | 19.6/8.52/2.0/564 | 29.0/4.1/571 (yarn) |

I claim:

1. Polyesters of fiber-forming molecular weight consisting essentially of units having the following structural formulas:

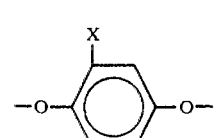

I

-continued

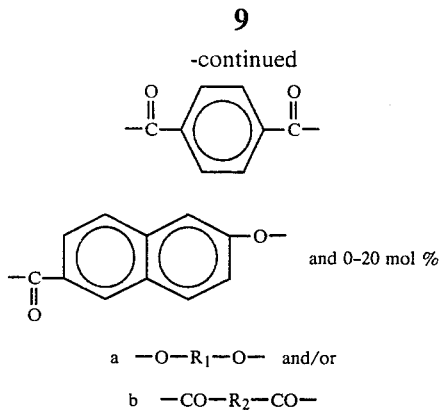

II

III and 0-20 mol % a  —O—R₁—O—  and/or
b  —CO—R₂—CO—

IV wherein X is chloro- or methyl, and wherein unit 4a is a dioxy unit derived from hydroquinone, resorcinol, 2,5- or 2,6-dichlorohydroquinone, and unit IVb is isophthaloyl, in the proportions of about 75 to 95 mol % of Units I and II and about 5–25 mol % of Units III and IV of which at least 5 mol % is Unit III, the dioxy units and the dicarbonyl units in the polymer are substantially equimolar in quantity.

2. A filament of a polyester of claim 1.
3. A fiber-forming polyester according to claim 1 consisting essentially of Units I, II and III.
4. A filament of the polyester of claim 3.
5. A fiber-forming polyester according to claim 1 wherein Unit IV is 1,3-dioxyphenylene.
6. A filament of the polyester of claim 5.
7. A fiber-forming polyester according to claim 1 wherein Unit IV is isophthaloyl.
8. A filament of the polyester of claim 7.
9. A fiber-forming polyester according to claim 1 wherein Unit IV is 1,4-dioxyphenylene.
10. A filament of the polyester of claim 9.
11. A fiber-forming polyester according to claim 1 wherein X is chloro-.
12. A filament of the polyester of claim 11.

* * * * *